Patented Oct. 10, 1950

2,524,947

UNITED STATES PATENT OFFICE 2,524,947

CONCRETE COMPOSITION

George W. Wallace, Benton, Ill.

No Drawing. Application August 9, 1946,
Serial No. 689,517

2 Claims. (Cl. 106—97)

This invention relates in general to certain new and useful improvements in construction materials and, more particularly, to an improved type of concrete-like material and a unique aggregate therefor.

Conventional types of concrete consist of mixtures of cement, sand, and gravel in varying proportions, depending upon the particular uses and applications to which the material is being put. Frequently limestone is substituted entirely or in part for gravel in concrete mixes. In any case, the established and recognized aggregate material in conventional concrete consists of two or more components, such as the sand and gravel above mentioned, or sand and limestone, or sand and mixtures of gravel and limestone, as the case may be. These aggregates represent the well accepted and only types of aggregates employed in concrete mixes for building purposes, although in recent years one or two special aggregates, such as expanded shale and expanded vermiculite, have been developed for highly specific applications as, for instance, formation of high temperature concrete for use in furnace construction and lightweight concrete for roof slabs, in which applications the non-structural physical characteristics of the resulting product are of primary importance and, of course, such special aggregates are so very expensive that they cannot be economically used for general structural purposes.

It is, accordingly, the primary object of the present invention to provide a new and unique type of structural concrete adaptable for general building and structural purposes which is simple and economical in preparation and is less expensive in ultimate cost than conventional concrete.

It is a further object of the present invention to provide a concrete of the type stated which possesses structural strength and thermal insulating properties far in excess of concrete conventionally used in construction work.

It is an additional object of the present invention to provide a unique aggregate for use in the preparation of concrete, which aggregate is extremely economical in cost, is widely available and readily transportable, and is capable of producing a concrete which has remarkably improved physical characteristics.

It is a further object of the present invention to provide a unique type of aggregate for use in concrete mixes, which aggregate consists of a single and relatively homogeneous material rather than a combination of dissimilar materials.

And with the above and other objects in view, my invention resides in the novel processes and compositions of matter presently described and pointed out in the claims.

Broadly speaking, the present invention resides in the discovery that concrete for building and structural purposes can be made from mixes consisting of hydraulic cement with an aggregate comprising comminuted burnt gob. This aggregate is quite widely available as a residual product resulting from coal-mining operation. Practically all coal when mined contains non-burnable materials, such as slate, shale, blueband, and other refuse-forming ingredients. These materials are removed from the coal by screening, washing, and picking processes and accumulated in a refuse pile, which, in the normal course of events, will sooner or later catch fire as the result of spontaneous combustion and, when burnt out, becomes known as burnt gob. Burnt gob can also be made by burning the refuse material in a suitable oven or retort under controlled conditions if, for any reason, it is undesirable for the gob pile to burn of its own accord.

In preparing the aggregate of the present invention, the burnt gob is washed to remove coal ash, clay, slime-forming materials, and unburnt coal. The washed material is then crushed and sized on suitable screens. If desired, the washing step may be eliminated and a hand-picking operation substituted therefor, although in general hand-picking methods are more expensive and, therefore, less satisfactory. In screening the crushed material, it is preferable to employ two or more screens so as to screen out the extremely large, partially crushed particles for re-run through the crusher. The crushing and screening operations are so conducted as to achieve an aggregate preferably having the following screen analysis:

| Mesh | Percent Cumulative |
|---|---|
| 2.5 | 3.29 |
| 3 | 10.43 |
| 3.5 | 16.71 |
| 4 | 21.45 |
| 6 | 30.12 |
| 8 | 35.49 |
| 10 | 40.67 |
| 14 | 53.46 |
| 20 | 64.31 |
| 28 | 72.40 |
| 35 | 79.05 |
| 48 | 89.09 |
| 65 | 95.94 |
| 100 | 98.41 |
| 150 | 99.61 |
| 200 | 99.79 |

Aggregate having the above screen analysis has been found to be ideally suited for use in concrete mixes which are to be employed in the construction of building blocks and so-called "concrete bricks." It will, of course, be understood that material having somewhat different screen analyses may be used, it merely being necessary to provide a sufficient proportion of fine materials to fill the voids between the coarser particles.

It has been found in actual use that the aggregate of the present invention may be directly substituted for the conventional sand-gravel-limestone aggregates, that is to say, the quantity of aggregate of the present invention may be equal to the total quantity of sand, gravel, and limestone forming the aggregate used in a standard mix. For example, one of the widely used conventional mixes of concrete is the so-called 1-2-3 mix, namely, one part of hydraulic cement, two parts sand, three parts gravel, making a total of five parts of aggregate material. The aggregate of the present invention may be substituted by making a mix consisting of one part cement and five parts prepared aggregate. Based on tests actually performed, it has been found that test blocks poured from concrete containing one part of cement and five parts of prepared aggregate of the present invention have a structural strength far in excess of the structural strength of a comparable block poured from the conventional 1-2-3 concrete mix. In addition, the thermal conductivity is much less in blocks containing the prepared aggregate of the present invention as compared with blocks made from conventional concrete mixes.

Concrete blocks and so-called concrete bricks made from concrete containing the prepared aggregate of the present invention have been tested against comparable blocks and concrete bricks made from conventional concrete mixes and have been found to be much more resistant to permeation and disintegration by the action of water, to be much more fire resistant, to be much lighter in weight even though much stronger in structural strength, and to reach its maximum strength in aging tests much more quickly.

It should be understood that changes in the methods, compositions, percentages, and combinations above set forth may be made without departing from the nature and principle of my invention.

Having thus described my invention, what I claim and desire to secure by Letters Patent is:

1. A structural and building concrete comprising hydraulic cement and an aggregate formed of comminuted burnt gob, approximately fifty percent of which will be retained by a fourteen mesh screen and approximately ninety-five percent of which will be retained on a sixty-five mesh screen.

2. A structural and building concrete comprising hydraulic cement and an aggregate formed of comminuted burnt gob, said aggregate having the following screen analysis:

| Mesh | Approximate per cent retained (cumulative) |
|------|-------|
| 2.5  | 3     |
| 3    | 10    |
| 3.5  | 16    |
| 4    | 21    |
| 6    | 30    |
| 8    | 35    |
| 10   | 40    |
| 14   | 53    |
| 20   | 64    |
| 28   | 72    |
| 35   | 79    |
| 48   | 89    |
| 65   | 95    |
| 100  | 98    |
| 150  | 99    |
| 200  | 99    |

GEORGE W. WALLACE.

REFERENCES CITED

The following references are of record in the file of this patent:

UNITED STATES PATENTS

| Number | Name | Date |
|--------|------|------|
| 275,369 | De Smedt | Apr. 10, 1883 |
| 366,012 | Lorenz | July 5, 1887 |
| 1,645,030 | Taylor | Oct. 11, 1927 |
| 1,782,748 | Smith | Nov. 25, 1930 |

OTHER REFERENCES

Concrete Plain and Reinforced, Taylor & Thompson, 3rd edition; published 1917 by John Wiley & Sons, Inc. Page 120.

Johnson's Materials of Construction, 5th edition, published 1919 by John Wiley & Sons, Inc., New York, N. Y. Page 414.